(12) United States Patent
Azizi et al.

(10) Patent No.: US 10,939,378 B2
(45) Date of Patent: Mar. 2, 2021

(54) METHODS TO ENCODE A BINARY PHASE SHIFT KEYING (BPSK) MARK FOR A WAKE-UP RADIO (WUR) PACKET

(71) Applicant: Intel Corporation, Santa Clara, CA (US)

(72) Inventors: Shahrnaz Azizi, Cupertino, CA (US); Thomas J. Kenney, Portland, OR (US); Alexander W. Min, Portland, OR (US); Po-Kai Huang, San Jose, CA (US); Vinod Kristem, Santa Clara, CA (US); Minyoung Park, San Ramon, CA (US); Laurent Cariou, Portland, OR (US); Xiaogang Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/891,558

(22) Filed: Jun. 3, 2020

(65) Prior Publication Data
US 2020/0296669 A1     Sep. 17, 2020

Related U.S. Application Data

(63) Continuation of application No. 16/381,548, filed on Apr. 11, 2019, now Pat. No. 10,779,236.
(Continued)

(51) Int. Cl.
*H04W 52/02* (2009.01)
*H04W 28/06* (2009.01)
(Continued)

(52) U.S. Cl.
CPC ..... *H04W 52/0229* (2013.01); *H04W 28/065* (2013.01); *H04L 5/0007* (2013.01);
(Continued)

(58) Field of Classification Search
CPC ......... H04L 5/007; H04L 27/02; H04L 27/18; H04L 27/2602; H04L 27/2605;
(Continued)

(56) References Cited

U.S. PATENT DOCUMENTS 9,485,733 B1   11/2016   Park et al.
9,749,958 B1   8/2017   Segev et al.
(Continued)

OTHER PUBLICATIONS

"Efficient FDMA MU Transmission Schemes for WUR WLAN"; Liu et al.; Nov. 2017; IEEE 802.11-17/1625r2 (Year: 2017).*
(Continued)

*Primary Examiner* — Benjamin H Elliott, IV
(74) *Attorney, Agent, or Firm* — Schwegman Lundberg & Woessner, P.A.

(57) ABSTRACT

Embodiments of an AP and wake up radio (WUR) non-AP station (STA) are generally described herein. The AP may transmit a WUR packet to wake up a wireless local area network (WLAN) radio of the WUR non-AP STA. A non-WUR portion of the WUR packet may include legacy fields and a BPSK mark to spoof high throughput (HT) devices receiving the WUR packet. The AP may transmit the BPSK mark in a channel that includes a lower guard band, a transmission bandwidth, and an upper guard band. The AP may encode the BPSK mark in accordance with: on-off keying (OOK) modulation in a center portion of the transmission bandwidth; and orthogonal frequency division multiplexing (OFDM) in a remaining portion of the transmission bandwidth that excludes the center portion.

20 Claims, 15 Drawing Sheets

Related U.S. Application Data

(60) Provisional application No. 62/655,957, filed on Apr. 11, 2018, provisional application No. 62/665,723, filed on May 2, 2018, provisional application No. 62/721,057, filed on Aug. 22, 2018.

(51) Int. Cl.
    *H04L 5/00*         (2006.01)
    *H04L 27/18*       (2006.01)
    *H04L 27/02*       (2006.01)
    *H04W 84/12*     (2009.01)

(52) U.S. Cl.
    CPC .............. *H04L 27/02* (2013.01); *H04L 27/18* (2013.01); *H04W 84/12* (2013.01)

(58) Field of Classification Search
    CPC ............. H04L 27/2613; H04L 27/2675; H04L 5/0007; H04W 52/0229; H04W 28/065; H04W 84/12; H04W 80/02
    See application file for complete search history.

(56) References Cited

U.S. PATENT DOCUMENTS

| | | | |
|---|---|---|---|
| 10,091,728 | B2 | 10/2018 | Yang |
| 10,129,064 | B1 | 11/2018 | Lee et al. |
| 10,341,149 | B2 | 7/2019 | Park et al. |
| 10,362,538 | B2 | 7/2019 | Gao et al. |
| 10,779,236 | B2 * | 9/2020 | Azizi .................... H04L 5/0053 |
| 2004/0224728 | A1 | 11/2004 | Dacosta et al. |
| 2017/0094600 | A1 | 3/2017 | Min et al. |
| 2018/0019902 | A1 | 1/2018 | Suh et al. |
| 2018/0077641 | A1 | 3/2018 | Yang |
| 2018/0084501 | A1 | 3/2018 | Mu et al. |
| 2018/0103431 | A1 | 4/2018 | Suh et al. |
| 2018/0152333 | A1 * | 5/2018 | Shellhammer .... H04W 52/0229 |
| 2018/0184378 | A1 | 6/2018 | Fang et al. |
| 2018/0227070 | A1 | 8/2018 | Suh et al. |
| 2018/0343081 | A1 | 11/2018 | Lopez |
| 2018/0376370 | A1 | 12/2018 | Shellhammer et al. |
| 2019/0036754 | A1 | 1/2019 | Lee et al. |
| 2019/0082385 | A1 | 3/2019 | Shellhammer et al. |
| 2019/0116554 | A1 | 4/2019 | Kristem et al. |
| 2019/0223104 | A1 * | 7/2019 | Huang .............. H04W 52/0216 |
| 2019/0246356 | A1 | 8/2019 | Kim et al. |
| 2019/0268192 | A1 | 8/2019 | Lim et al. |
| 2019/0289547 | A1 | 9/2019 | Cao et al. |
| 2019/0306797 | A1 | 10/2019 | Azizi et al. |
| 2020/0029276 | A1 | 1/2020 | Kim et al. |
| 2020/0288396 | A1 * | 9/2020 | Park ................... H04W 52/0229 |
| 2020/0296669 | A1 * | 9/2020 | Azizi ................... H04L 27/2613 |
| 2020/0322889 | A1 * | 10/2020 | Chitrakar .............. H04W 52/02 |

OTHER PUBLICATIONS

"Efficient FDMA MU Transmission Schemes for WUR WLAN"; Liu et al.; Nov. 2017; IEEE 802.11-17/1625r6 (Year: 2017).*
"2 us OOK pulse for high rate"; Kristem et al.; Jan. 2018; IEEE 802.11-18/-0097r0 (Year: 2018).*
"Proposed Draft WUR PHY Specification"; Shellhammer et al.; Jan. 2018 (Year: 2018).*
"OOK Waveform for FDMA"; Sahin et al.; Apr. 2018; IEEE 802.11-18/0682r0 (Year: 2018).*
"Draft Spect Text for FDMA WUR Generation"; Suh et al.; May 2018 (Year: 2018).*
"U.S. Appl. No. 16/381,548, Notice of Allowance dated May 11, 2020", 18 pgs.
"U.S. Appl. No. 16/381,548, Preliminary Amendment filed May 6, 2019", 3 pgs.
U.S. Appl. No. 16/381,549, filed Apr. 11, 2019, Methods to Encode a Binary Phase Shift Keying (BPSK) Mark for a Wake-Up Radio (WUR) Packet.

\* cited by examiner

METHODS TO ENCODE A BINARY PHASE SHIFT KEYING (BPSK) MARK FOR A WAKE-UP RADIO (WUR) PACKET

PRIORITY CLAIM

This application is a continuation of U.S. patent application Ser. No. 16/381,548, filed Apr. 11, 2019, which claims the benefit of priority under 35 U.S.C. 119(e) to U.S. Provisional Patent Application Ser. No. 62/655,957, filed Apr. 11, 2018 [reference number AB0403-Z, 4884.714PRV], U.S. Provisional Patent Application Ser. No. 62/665,723, filed May 2, 2018, and U.S. Provisional Patent Application Ser. No. 62/721,05, filed Aug. 22, 2018, each of each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ba. Some embodiments relate to wake-up radio (WUR). Some embodiments relate to methods, computer readable media, and apparatus for encoding of a binary phase shift keying (BPSK) mark.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
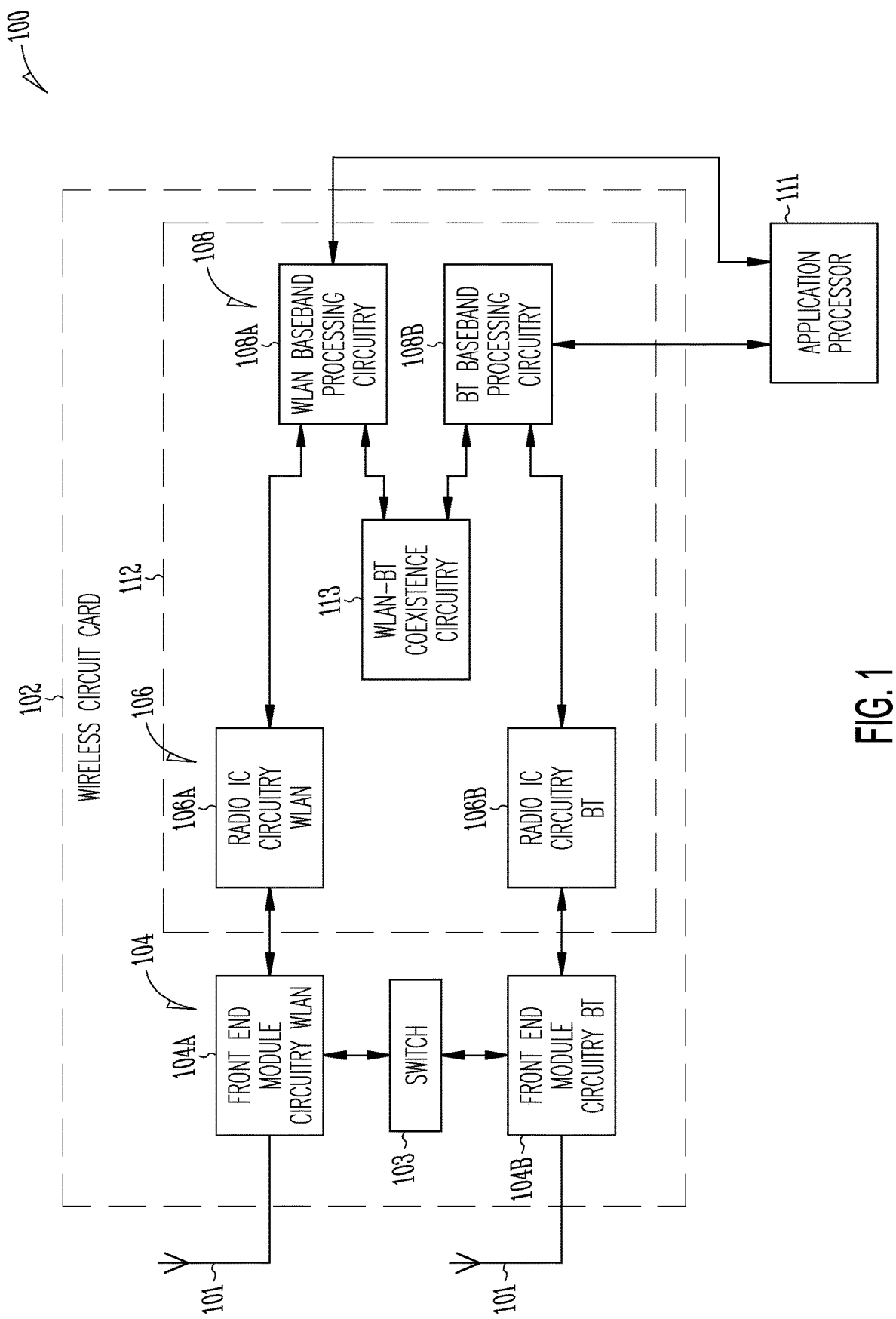
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert WI RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 1106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101, In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ba, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for wake-up radio (WUR) operation in accordance with the IEEE 802.11ba standard. In these embodiments, the radio architecture 100 may be configured to communicate in accordance with an OFDM technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a 131 functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LIE, LIE-Advanced or 5G communications).

In some IEEE 802.11 embodiments, the radio architecture 100 may be configured for communication over various channel bandwidths including bandwidths having center frequencies of about 900 MHz, 2.4 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
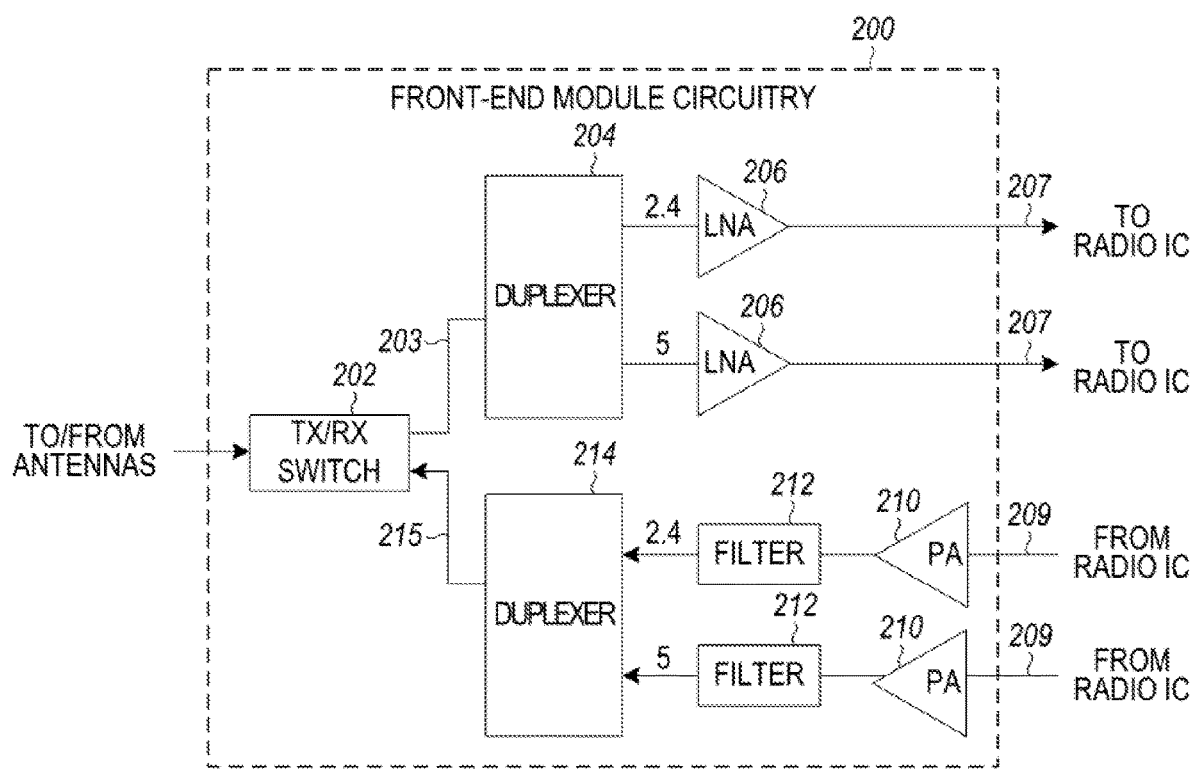
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
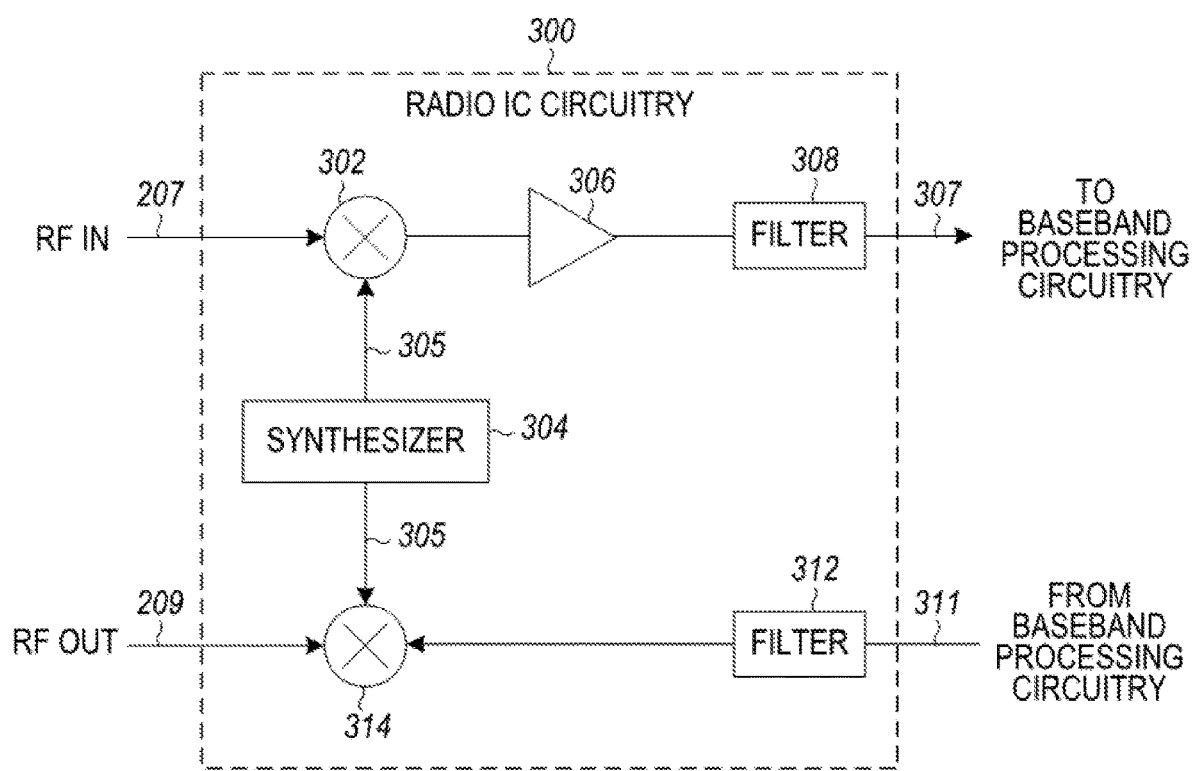
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RE input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
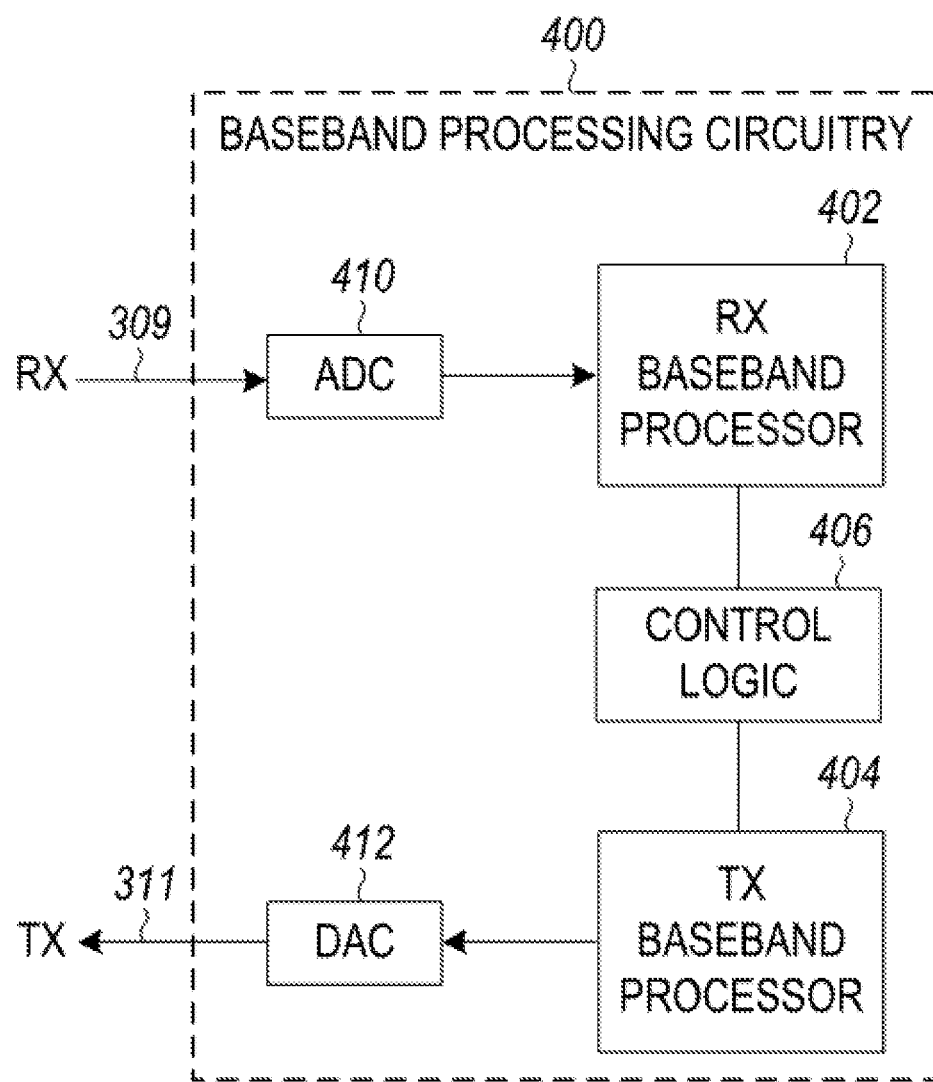
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
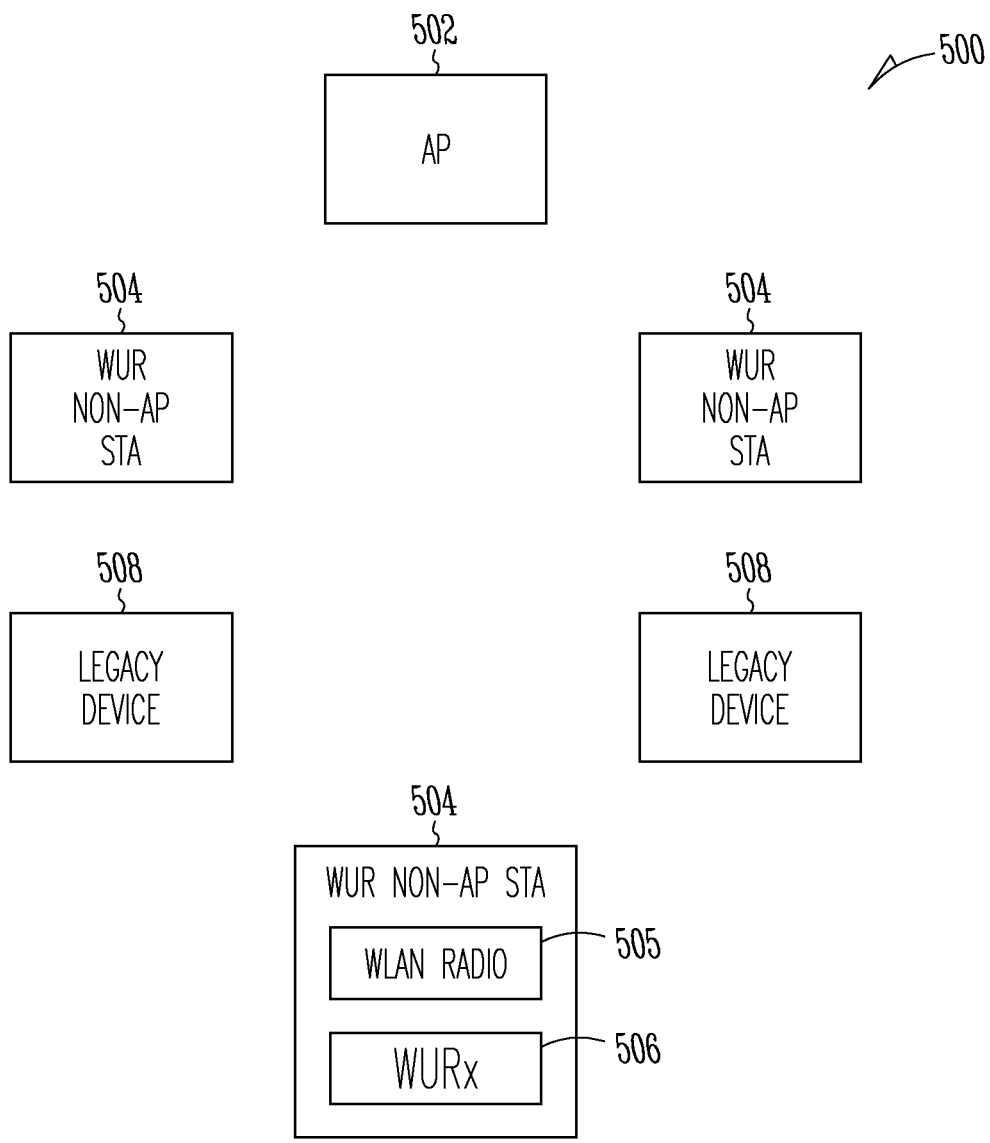
FIG. 5 illustrates a WLAN in accordance with some embodiments.

FIG. 5 illustrates a WLAN 500 in accordance with some embodiments. The WLAN 500 may include an access point (AP) 502 and one or more stations (STAs) 504. In some embodiments, the WLAN 500 may support one or more legacy devices 508, although the scope of embodiments is not limited in this respect.

In some embodiments, an STA 504 may be a wake-up radio non-AP STA (WUR non-AP STA) or may be configured to operate as a WUR non-AP STA. As illustrated in FIG. 5, the WUR non-AP STA 504 may comprise a wireless local area network (WLAN) radio 505 and a WUR receiver (WURx) 506. In some descriptions herein, one or more techniques, operations, and/or methods may be performed by a WUR non-AP STA 504 that comprises a WLAN radio 505 and a WURx 506, but the scope of embodiments is not limited in this respect. Other devices (including other STAs, legacy devices 508 and/or other) may perform one or more of those techniques, operations and/or methods, in some embodiments.

The AP 502 may use one or more IEEE 802.11 protocols (such as 802.11ba and/or other(s)) to transmit and receive. The AP 502 may be a base station. The AP 502 may use other communications protocols as well as the IEEE 802.11 protocol. The IEEE 802.11 protocol may be IEEE 802.11ba. The IEEE 802.11 protocol may include using orthogonal frequency division multiplexing (OFDM), orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). In some embodiments, there may be more than one AP 502 that is part of an extended service set (ESS). In some embodiments, a controller (not illustrated) may store information that is common to the more than one AP 502.

The legacy devices 508 may operate in accordance with one or more of IEEE 802.11 a/b/g/n/ac/ad/af/ah/aj/ay, or another legacy wireless communication standard. The legacy devices 508 may be STAs or IEEE STAs. The WUR non-AP STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The HE AP 502 may communicate with legacy devices 508 in accordance with legacy IEEE 802.11 communication techniques. In example embodiments, the HE AP 502 may also be configured to communicate with WUR non-AP STAs 504 in accordance with legacy IEEE 802.11 communication techniques.

In some embodiments, a frame may be configurable to have the same bandwidth as a channel. In some embodiments, the frame may be a physical Layer Convergence Procedure (PLCP) Protocol Data Unit (PPDU). In some embodiments, there may be different types of PPDUs that may have different fields and different physical layers and/or different media access control (MAC) layers.

In some embodiments, the bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 2.0 MHz. In some embodiments a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, a frame may be configured for transmitting a number of spatial streams, which may be in accordance with MI-MIMO and may be in accordance with OFDMA and/or OFDM. In some embodiments, the AP 502, WUR non-AP STA 504, and/or legacy device 508 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In some embodiments, the AP 502 may also communicate with legacy stations 508 and/or WUR non-AP STAs 504 and/or STAs 504 in accordance with legacy IEEE 802.11 communication techniques. In some embodiments, the WUR non-AP STA 504 and/or AP 502 and/or STA 504 may be configured to operate in accordance with IEEE 802.11ba. In example embodiments, the radio architecture of FIG. 1 is configured to implement the WUR non-AP STA 504 and/or AP 502 and/or STA 504. In example embodiments, the front-end module circuitry of FIG. 2 is configured to implement the WUR non-AP STA 504 and/or AP 502 and/or STA 504. In example embodiments, the radio IC circuitry of FIG. 3 is configured to implement the WUR non-AP STA 504 and/or AP 502 and/or STA 504. In example embodiments, the base-band processing circuitry of FIG. 4 is configured to implement the WUR non-AP STA 504 and/or AP 502 and/or STA 504.

In example embodiments, the WUR non-AP STA 504, AP 502, STA 504, an apparatus of the WUR non-AP STA 504, an apparatus of the AP 502 and/or an apparatus of the STA 504 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-15. In example embodiments, the WUR non-AP STA 504 and/or the AP 502 and/or the STA 504 are configured to perform the methods and operations/functions described herein in conjunction with FIGS. 1-15. In example embodiments, an apparatus of the WUR non-AP STA 504 and/or an apparatus of the AP 502 and/or an apparatus of the STA 504 are configured to perform the methods and functions described herein in conjunction with FIGS. 1-15. The term Wi-Fi may refer to one or more of the IEEE 802.11 communication standards. AP and STA may refer to AP 502 and/or WUR non-AP STA. 504 and/or legacy devices 508.

Figure 6:
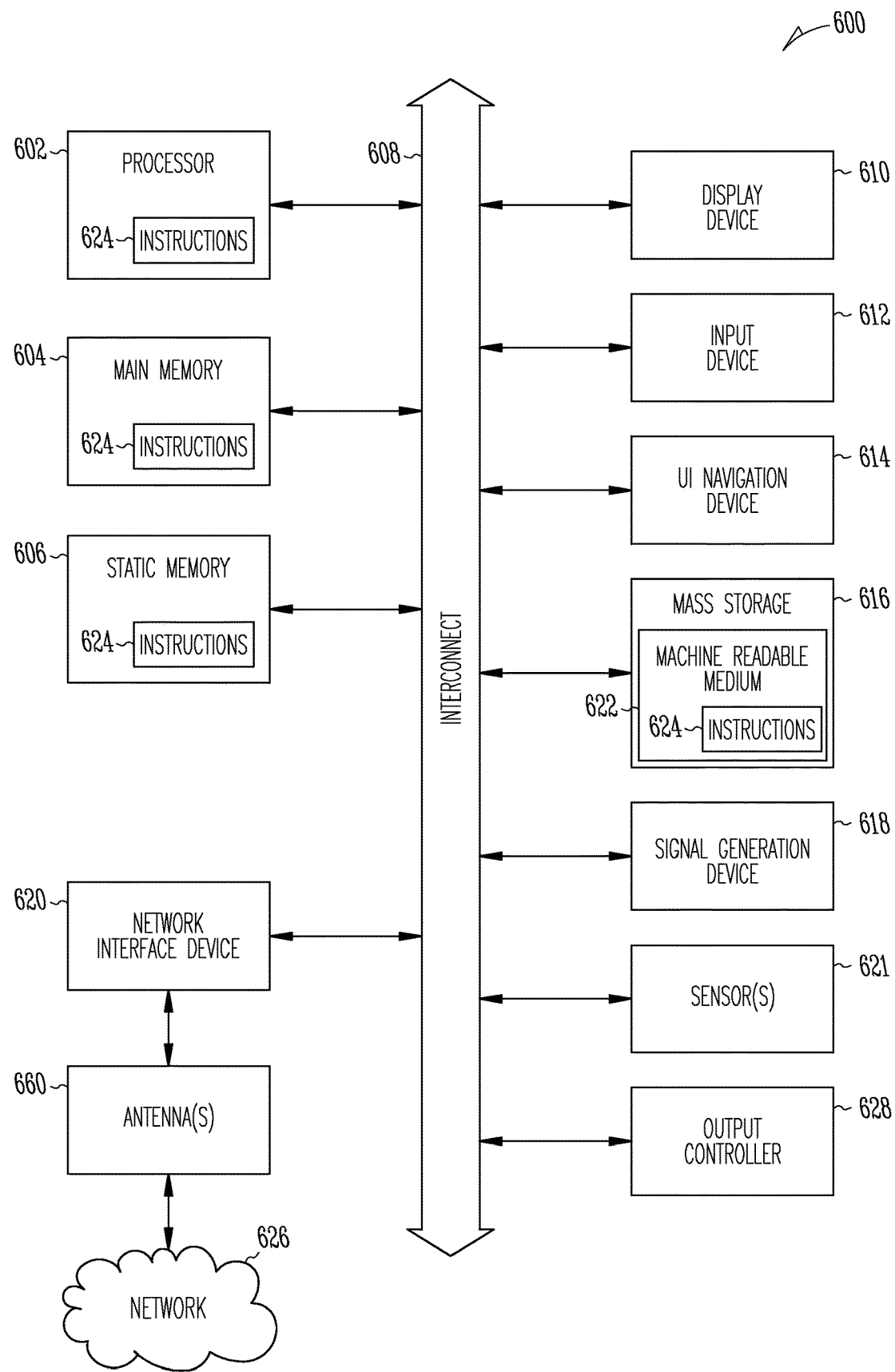
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, WUR non-AP STA 504, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE)

family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
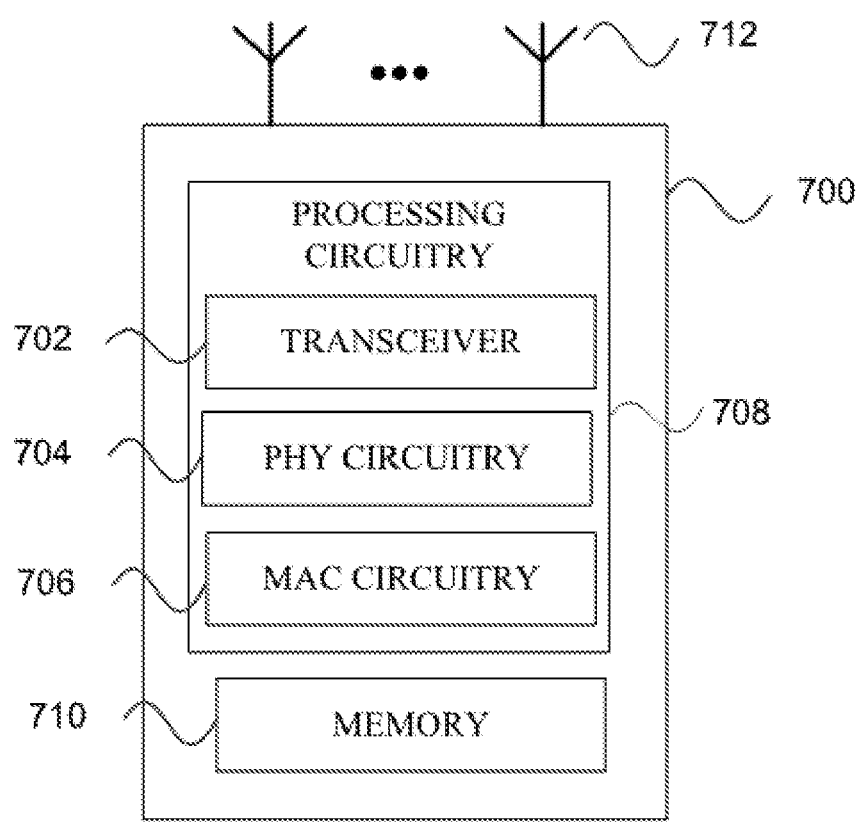
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a WUR non-AP STA 504, STA 504 and/or AP 502 (e.g., FIG. 5). A WUR non-AP STA 504, STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., WUR non-AP STA 504, STA 504, AP 502 and/or legacy devices 508) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PITY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6, In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., WUR non-AP STA 504, STA 504 and/or AP 502), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the AP 502 may transmit, to a wake-up receiver (WURx) 506 of a wake-up radio non-access point (AP) station (WUR non-AP STA) 504, a wake-up radio (Milt) packet to wake up a wireless local area network (WLAN) radio 505 of the WUR non-AP STA 504. The AP 502 may encode a non-WUR portion of the WUR packet to include a legacy short training field (L-STF), a legacy long training field (L-LTF), a legacy signal field (L-SIG), and a binary phase-shift keying (BPSK) mark, the BPSK mark to spoof high throughput (HT) devices receiving the WUR packet. The AP 502 may transmit the BPSK mark in a channel that includes a lower guard band, a transmission bandwidth, and an upper guard band. The AP 502 may encode the BPSK mark in accordance with: on-off keying (OOK) modulation in a center portion of the transmission bandwidth; and orthogonal frequency division multiplexing (OFDM) in a remaining portion of the transmission bandwidth that excludes the center portion, wherein the remaining portion of the transmission bandwidth is divided into data subcarriers, wherein BPSK symbols are mapped to the data subcarriers. These embodiments are described in more detail below.

Figure 8:
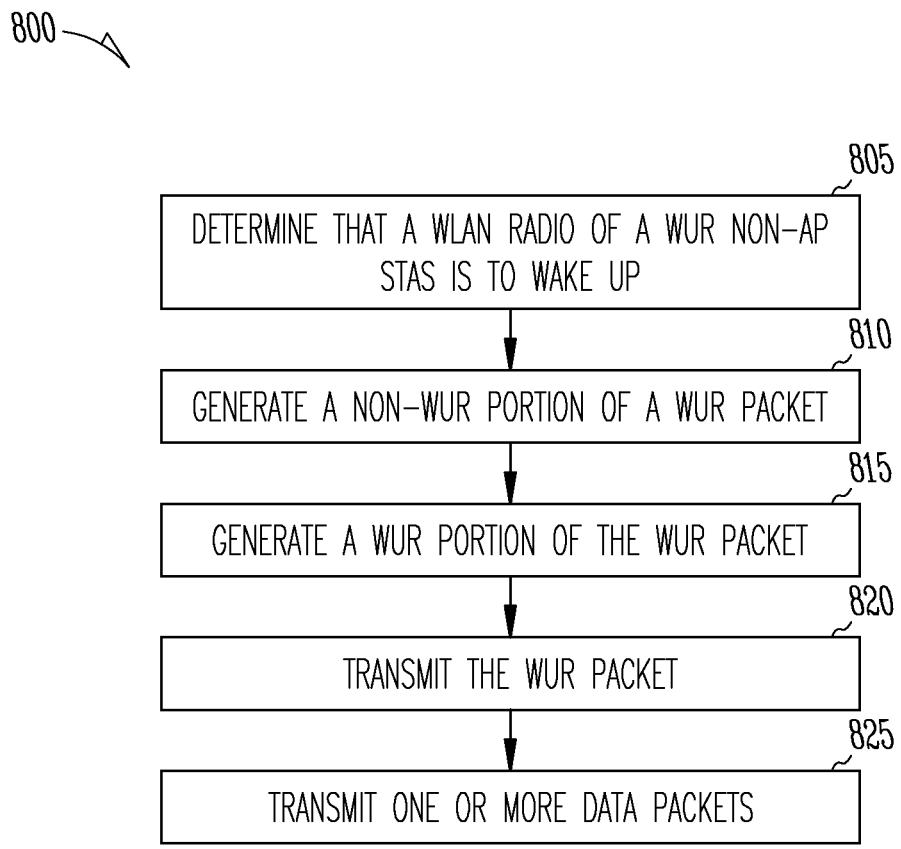
FIG. 8 illustrates the operation of a method in accordance with some embodiments.
Figure 9:
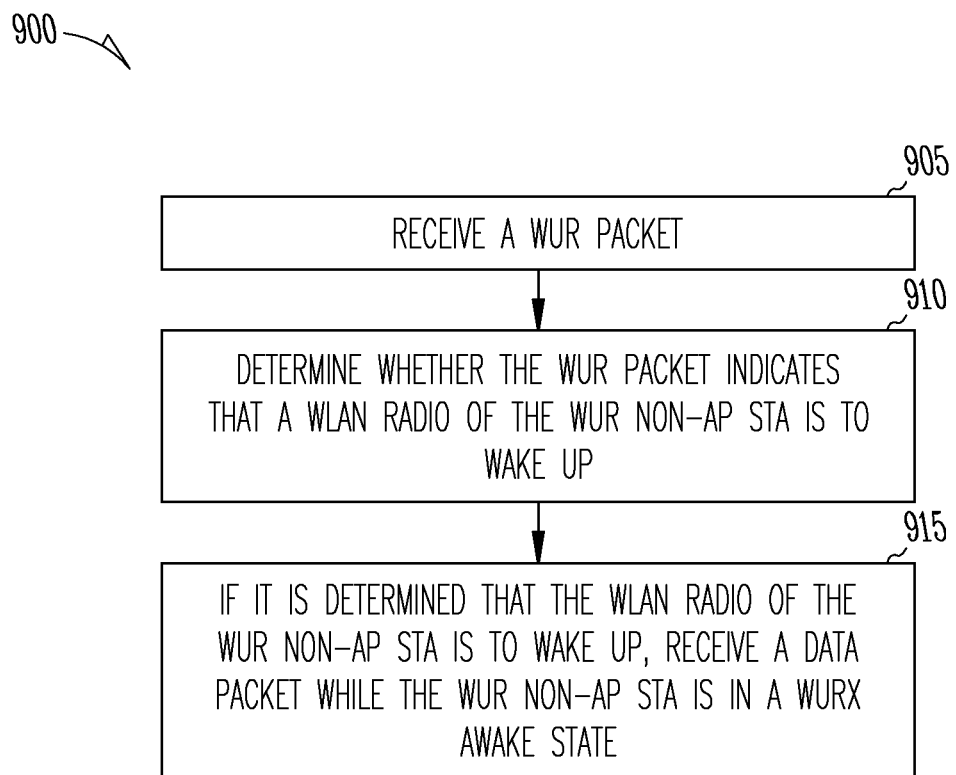
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9, In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the WUR non-AP STA 504 (and/or STA 504) may perform an operation that may be the same as, similar to, reciprocal to and/or related to an operation of the method 800, in some embodiments.

In some embodiments, a WUR non-AP STA 504 may perform one or more operations of the method 900, but embodiments are not limited to performance of the method 900 and/or operations of it by the WUR non-AP STA 504. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900, In a non-limiting example, the AP 502 may perform an operation that may be the same as, similar to, reciprocal to and/or related to an operation of the method 900, in some embodiments. In another non-limiting example, an STA 504 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the AP 502, and an operation of the method 900 may include reception of a same element (and/or similar element) by the WUR non-AP STA 504. In some cases, descriptions of operations and techniques described as part of one of the methods 800, 900 may be relevant to the other method. Discussion of various techniques and concepts regarding one of the methods 800, 900 and/or other method may be applicable to one of the other methods, although the scope of embodiments is not limited in this respect.

The methods 800, 900 and other methods described herein may refer to APs 502, WUR non-AP STAs 504, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UI) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 may also be applicable to an apparatus of an AP 502, an apparatus of a WUR non-AP STA 504, an apparatus of an STA 504 and/or an apparatus of another device. In some embodiments, an apparatus of an AP 502 may perform one or more operations of the method 800 and/or other operations. In some embodiments, an apparatus of an WUR non-AP STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, IEEE 802.11ax and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the AP 502 may determine that a WLAN radio 505 of a WUR non-AP STA 504 is to wake up. In some embodiments, the AP 502 may determine that WLAN radios of one or more WUR non-AP STAs 504 are to wake up.

At operation 810, the AP 502 may generate a non-WUR portion of a WUR packet. At operation 815, the AP 502 may generate a WUR portion of the WUR packet. At operation 820, the AP 502 may transmit the WUR packet. At operation 825, the AP 502 may transmit one or more data packets.

In some embodiments, the AP 502 may transmit, to a wake-up receiver (WURx) 506 of a WUR non-AP STA 504, a wake-up radio (WUR) packet to wake up a WLAN radio 505 of the WUR non-AP STA 504. In some embodiments, the AP 502 may encode a non-WUR portion of the WUR packet to include one or more of: a legacy short training field (L-STF), a legacy long training field (L-LTF), a legacy signal field (L-SIG), a binary phase-shift keying (BPSK) mark and/or other field(s). In some embodiments, the BPSK mark is to spoof high throughput (HT) devices receiving the WUR packet. In some embodiments, the AP 502 may transmit the BPSK mark in a channel that includes a lower guard band, a transmission bandwidth, and an upper guard band. In some embodiments, the AP 502 may encode the BPSK mark in accordance with: on-off keying (OOK) modulation in a center portion of the transmission bandwidth; and orthogonal frequency division multiplexing (OFDM) in a remaining portion of the transmission bandwidth that excludes the center portion. In some embodiments, the remaining portion of the transmission bandwidth may be divided into data subcarriers. In some embodiments, BPSK symbols and/or other symbols may be mapped to the data subcarriers.

In some embodiments, the AP 502 may encode the non-WUR portion of the WUR packet to include the BPSK mark to spoof the HT devices to detect the WUR packet as a non-HT packet. In some embodiments, the AP 502 may encode the non-WUR portion of the WUR packet to include the BPSK mark to spoof the HT devices from detection of a first symbol of the WUR preamble as rotated BPSK.

In some embodiments, the AP 502 may encode a WUR preamble and a WUR payload for inclusion in a WUR portion of the WUR packet. In some embodiments, the WUR preamble and the WUR payload may be encoded in accordance with OOK modulation. In some embodiments, the WUR preamble is to be detected by the WURx 506 after the WUR non-AP STA 504 transitions from a WURx doze state to a WURx awake state. In some embodiments, the WUR preamble may indicate, to the WURx 506, to decode the WUR payload while the WUR non-AP STA 504 is in the WURx awake state.

In some embodiments, the remaining portion of the transmission bandwidth that excludes the center portion may further include one or more of: a first WUR guard band immediately below the center portion in frequency; a second WUR guard band immediately above the center portion in frequency; and/or other. In some embodiments, the AP 502 may refrain from mapping symbols to the first and second WUR guard bands in the BPSK mark.

In some embodiments, the AP 502 may perform one or more of the operations described herein in accordance with one or more of the following: the channel may be of bandwidth of 20 MHz; the data subcarriers are spaced by 312.5 kHz; the BPSK mark is of duration equal to 4 usec; the transmission bandwidth includes 53 data subcarriers; the center portion of the transmission bandwidth spans 13 data subcarriers. It should be noted that embodiments are not limited to example numbers and sizes described herein, such as those given above. For instance, embodiments are not limited to the bandwidths, subcarrier spacing, duration, sizes (in terms of number of subcarriers), and other aspects of the above.

In some embodiments, the AP 502 may encode the BPSK mark based on a predetermined OOK pattern.

In some embodiments, the AP 502 may encode the L-SIG based on a pattern of symbols mapped to 53 subcarriers that corresponds to the transmission bandwidth of the BPSK mark, and further based on another 4 bits mapped to 4 extra subcarriers in the lower guard band and/or upper guard band. In some embodiments, the AP 502 may encode the BPSK mark based on a plurality of encoded bits mapped to the 4 extra subcarriers. It should be noted that embodiments are not limited to example numbers and sizes described herein, such as those given above. For instance, embodiments are not limited to the bandwidths, subcarrier spacing, duration, sizes (in terms of number of subcarriers), and other aspects of the above.

In some embodiments, the AP 502 may encode the BPSK mark in accordance with OOK, modulation in the center portion of the transmission bandwidth to extend a WUR synchronization portion of the WUR preamble. In some embodiments, the AP 502 may encode the BPSK mark in accordance with OOK modulation in the center portion of the transmission bandwidth to enable automatic gain control (AGC) settling, detection of the WUR payload, or in WUR synchronization.

In some embodiments, the AP 502 may encode the WUR packet to wake up the WLAN radio 505 of the WUR non-AP STA 504 for reception of a data packet from the AP 502. In some embodiments, the AP 502 may encode the data packet for transmission to the WUR non-AP STA 504.

In some embodiments, the AP 502 may encode, for transmission to a wake-up receiver (WURx) 506 of a WUR non-AP STA 504, a WUR packet to wake up a WLAN radio 505 of the WUR non-AP STA 504, In some embodiments, the AP 502 may encode a non-WUR portion of the WUR packet to include one or more of: a legacy short training field (L-STF), a legacy long training field (L-LTF), a legacy signal field (L-SIG), a binary phase-shift keying (BPSK) mark, and/or other. In some embodiments, the BPSK mark may be to spoof high throughput (HT) devices receiving the WUR packet.

In some embodiments, the AP 502 may encode the L-SIG for OFDM transmission in a channel that includes a lower guard hand, a transmission bandwidth, and an upper guard band. In some embodiments, the AP 502 may encode the BPSK mark for OFDM transmission in at least a portion of the transmission bandwidth. In some embodiments, the AP 502 may extend the L-SIG by mapping one or more predetermined symbols to one or more extra subcarriers within the lower guard band and/or upper guard hand. In some embodiments, the AP 502 may extend the BPSK mark by mapping one or more encoded symbols to the extra subcarriers.

In some embodiments, the AP 502 may encode the L-SIG based on one or more of: a pattern of symbols mapped to 53 subcarriers of the transmission bandwidth; another 4 bits mapped to 4 extra subcarriers in the lower guard band and/or upper guard band; and/or other. In some embodiments, the AP 502 may encode the BPSK mark based on one or more of: encoded bits mapped to at least a portion of the 53 subcarriers of the transmission bandwidth; encoded bits mapped to the 4 extra subcarriers; and/or other. In some embodiments, the AP 502 may generate the encoded bits that are mapped at least a portion of the 53 subcarriers of the transmission bandwidth based on signaling bits intended for the WURx. It should be noted that embodiments are not limited to example numbers and sizes described herein, such as those given above. For instance, embodiments are not limited to the bandwidths, subcarrier spacing, duration, sizes (in terms of number of subcarriers), and other aspects of the above.

In some embodiments, the AP 502 may encode the WUR packet to include a WUR preamble immediately after the BPSK mark. In some embodiments, the AP 502 may encode the BPSK mark in accordance with OOK modulation in the center portion of the transmission bandwidth to extend a WUR synchronization portion of the WUR preamble.

In some embodiments, the AP 502 may encode a WUR packet to wake up one or WLAN radios 505 of one or more WUR non-AP STAs 504. In some embodiments, each of one or more WUR non-AP STAs 504 may comprise a WURx 506 and a WLAN radio 505. The AP 502 may encode the WUR packet to, for each of one or more WUR non-AP STAs 504, wake up the WLAN radio 505 of the WUR non-AP STA 504.

In some embodiments, the AP 502 may encode a WUR portion of the WUR packet as low data rate (LDR) or high data rate (LDR). In some embodiments, the AP 502 may, if the WUR portion is encoded as LDR, encode the WUR packet to include a legacy portion followed by the WUR portion. In some embodiments, the AP 502 may encode the WUR portion to include a WUR preamble and a WUR payload. In some embodiments, the WUR portion may be intended to wake up the WLAN radio 505 of one of the WUR non-AP STAs 504. In some embodiments, the AP 502 may, if the WUR portion is encoded as HDR: encode the WUR packet to include a legacy portion followed by multiple WUR portions time-multiplexed within the WUR portion. In some embodiments, the AP 502 may encode each of the WUR portions to include a WUR preamble and a WUR payload. In some embodiments, each of the WUR portions may be intended to wake up the WLAN radio 505 of one of the WUR non-AP STAs 504.

In some embodiments, the AP 502 may pad the WUR packet in accordance with a predetermined length. In some embodiments, the AP 502 may, if the WUR portion is encoded as LDR, and if a combined length of the legacy portion and the WUR portion is less than a threshold, generate a padding portion to follow the WUR portion.

In some embodiments, the AP 502 may In some embodiments, the AP 502 may, if the WUR portion is encoded as LDR, and if a combined length of the legacy portion and the multiple WUR portions is less than the threshold, generate a padding portion to follow the WUR portions.

In some embodiments, the AP 502 may encode the legacy portion of the WUR packet to include at least a legacy short training field (L-STF), a legacy long training field (L-LTF), and a legacy signal field (L-SIG).

In some embodiments, the AP 502 may encode the L-SIG to indicate a specified length for all WUR packets. In some embodiments, the AP 502 may determine a length of the WUR packet based on: if the WUR portion is encoded as LDR, a sum of a length of the legacy portion and a length of the WUR portion; or if the WUR portion is encoded as HDR, a sum of the length of the legacy portion and lengths of the multiple WUR portions. In some embodiments, the AP 502 may, if the determined length of the WUR packet is less than the specified length of all WUR packets, generate padding for the WUR packet by repetition of a Manchester on-off keying (OOK) waveform used for an information bit of value equal to 1. In some embodiments, the information bit of value 1 may correspond to an encoded bit pair of [0, 1].

In some embodiments, an apparatus of an AP 502 may comprise memory. The memory may be configurable to store information related to the WUR packet. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the WUR packet. The apparatus may include a transceiver to transmit the WUR packet. The transceiver may transmit and/or receive other blocks, messages and/or other elements.

At operation 905, the WUR non-AP STA 504 may receive a WUR packet. At operation 910, the WUR non-AP STA 504 may determine whether the WUR packet indicates that a WLAN radio 505 of the WUR non-AP STA 504 is to wake up. At operation 915, the WUR non-AP STA 504 may if it is determined that the WLAN radio 505 of the WUR non-AP STA 504 is to wake up, receive a data packet while the WUR non-AP STA 504 is in a WURx awake state.

In some embodiments, an apparatus of a WUR non-AP STA 504 may comprise memory. The memory may be configurable to store information related to the WUR packet. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the WUR packet. The apparatus may include a transceiver to receive the WUR packet. The transceiver may transmit and/or receive other blocks, messages and/or other elements.

Figure 10:
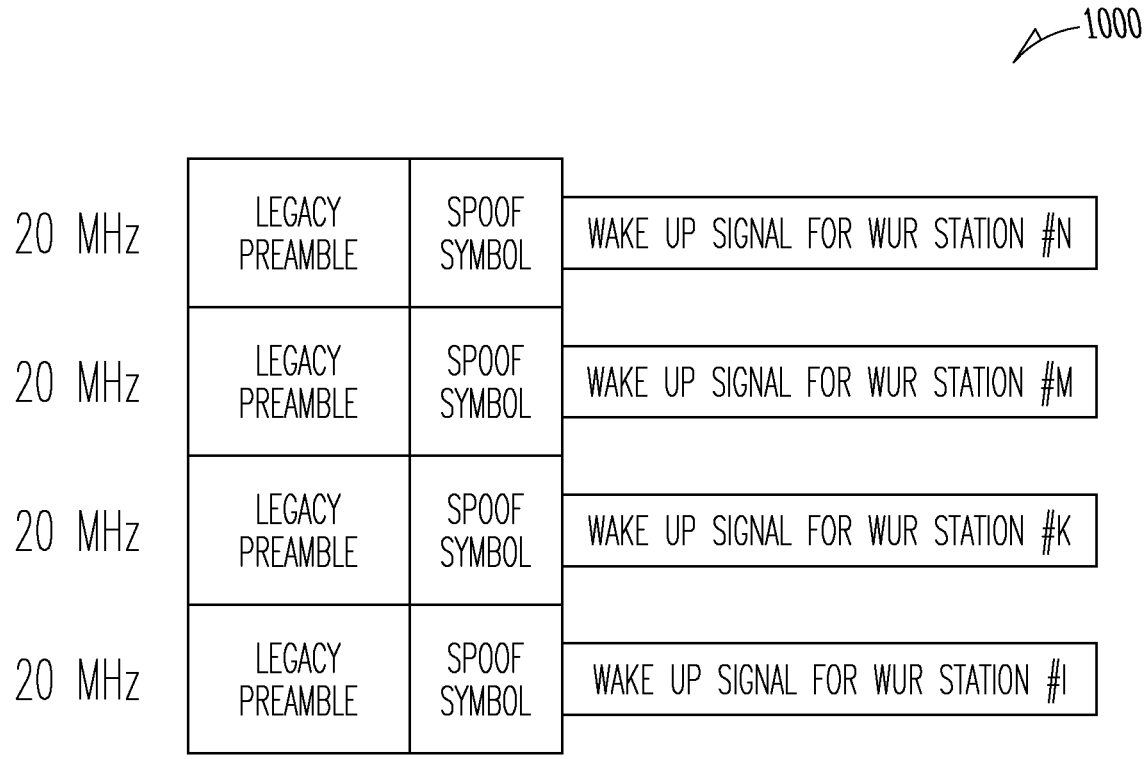
FIG. 10 illustrates example wake up radio (WUR) packets and fields in accordance with some embodiments.
Figure 11:
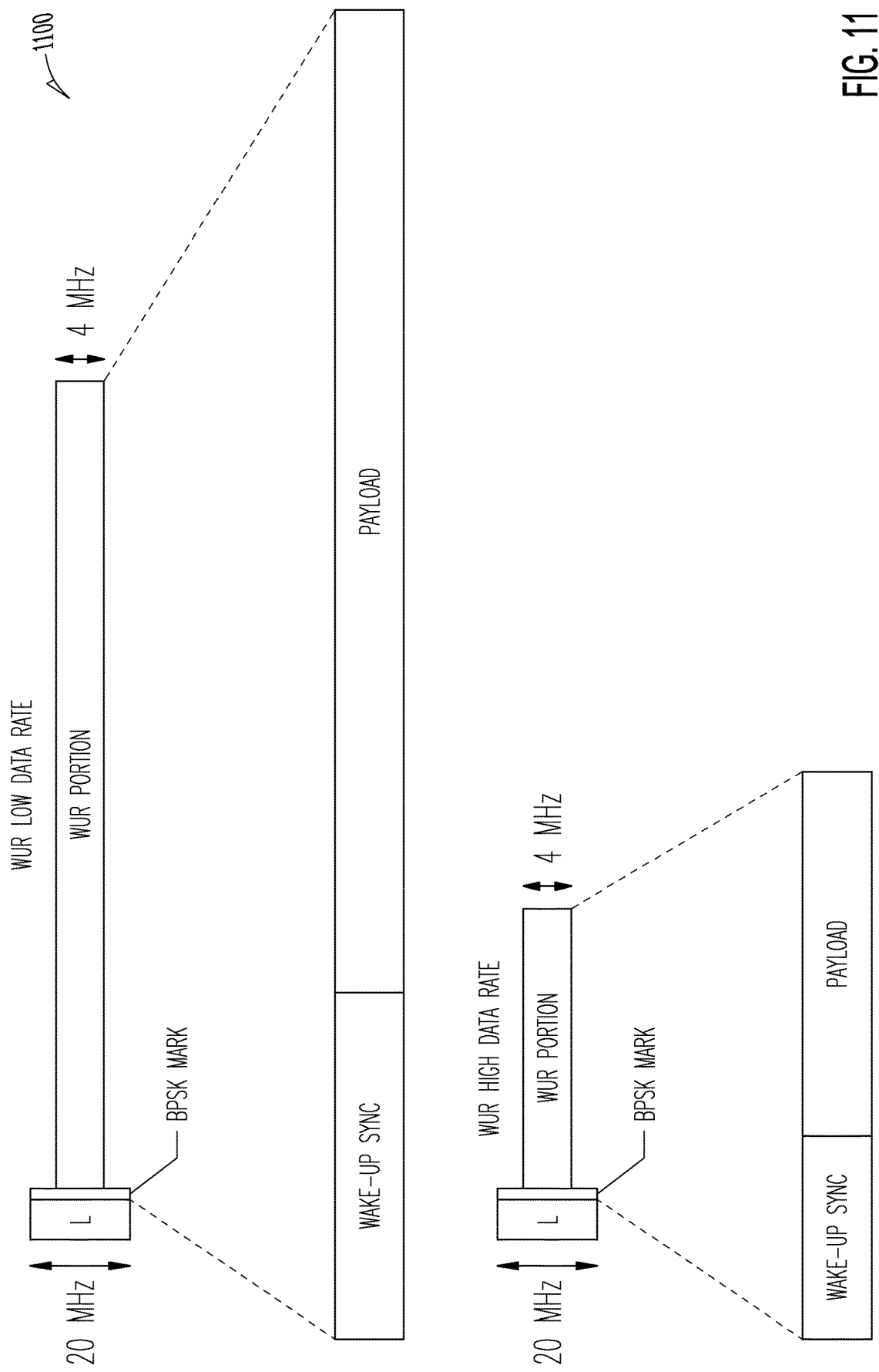
FIG. 11 illustrates example WUR packets and fields in accordance with some embodiments.
Figure 12:
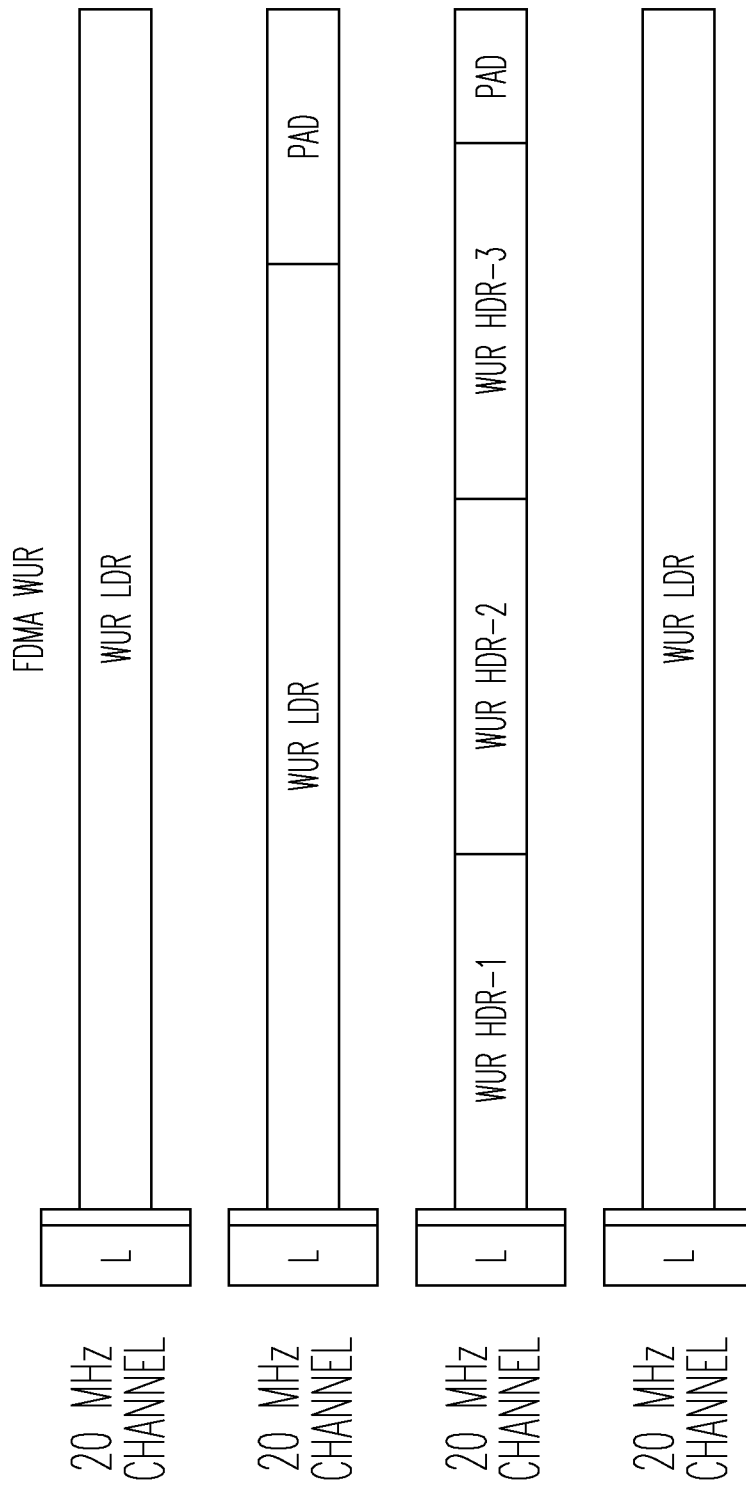
FIG. 12 illustrates example WUR packets and fields in accordance with some embodiments.
Figure 13:
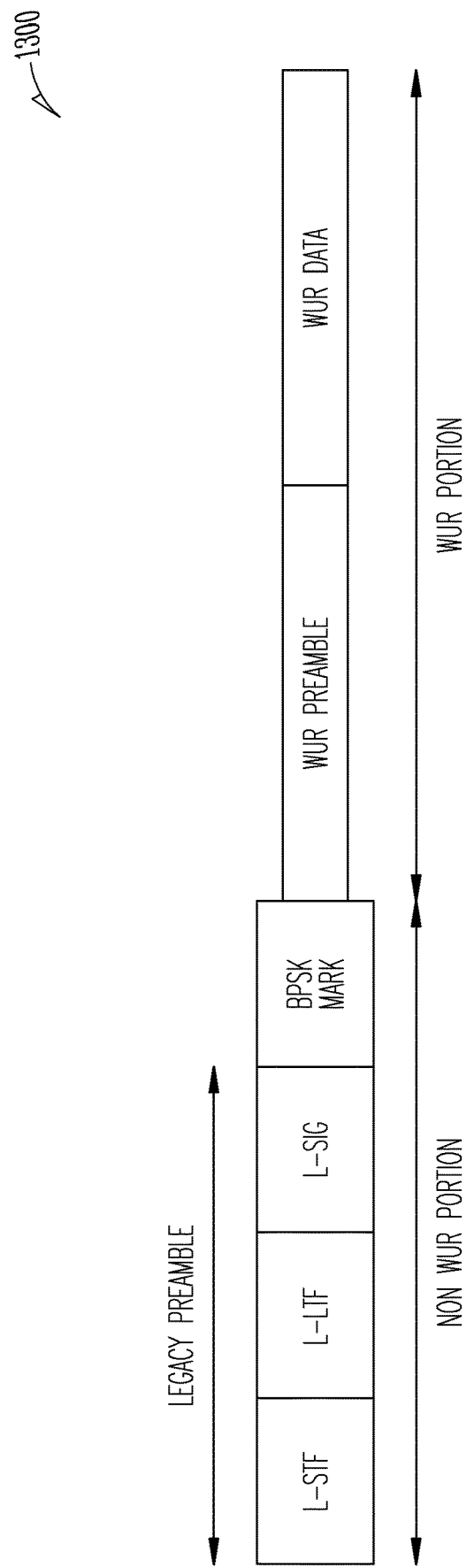
FIG. 13 illustrates an example WUR packet and example fields in accordance with some embodiments.
Figure 14:
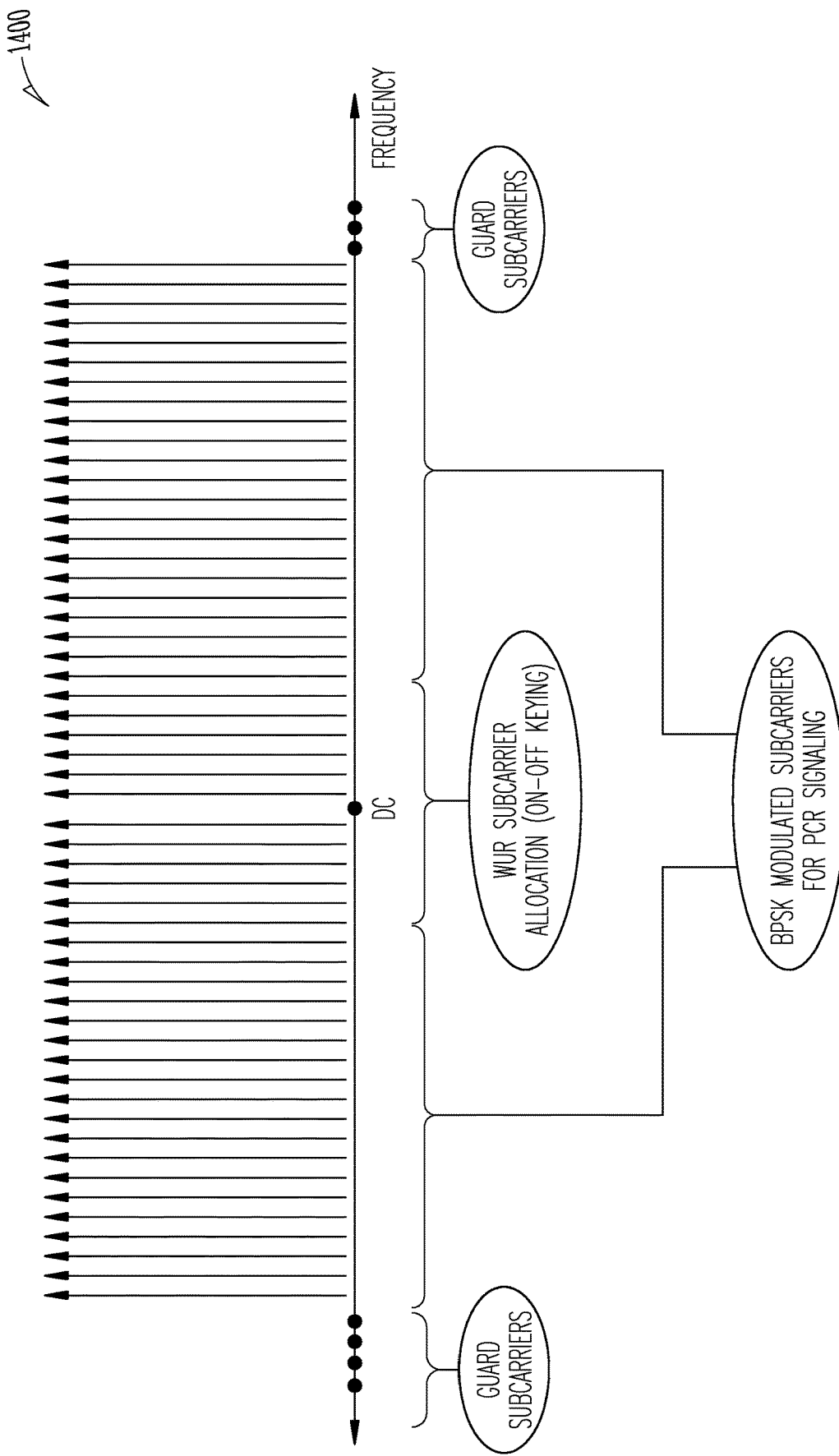
FIG. 14 illustrates an example in the frequency domain for WUR packet transmission in accordance with some embodiments.
Figure 15:
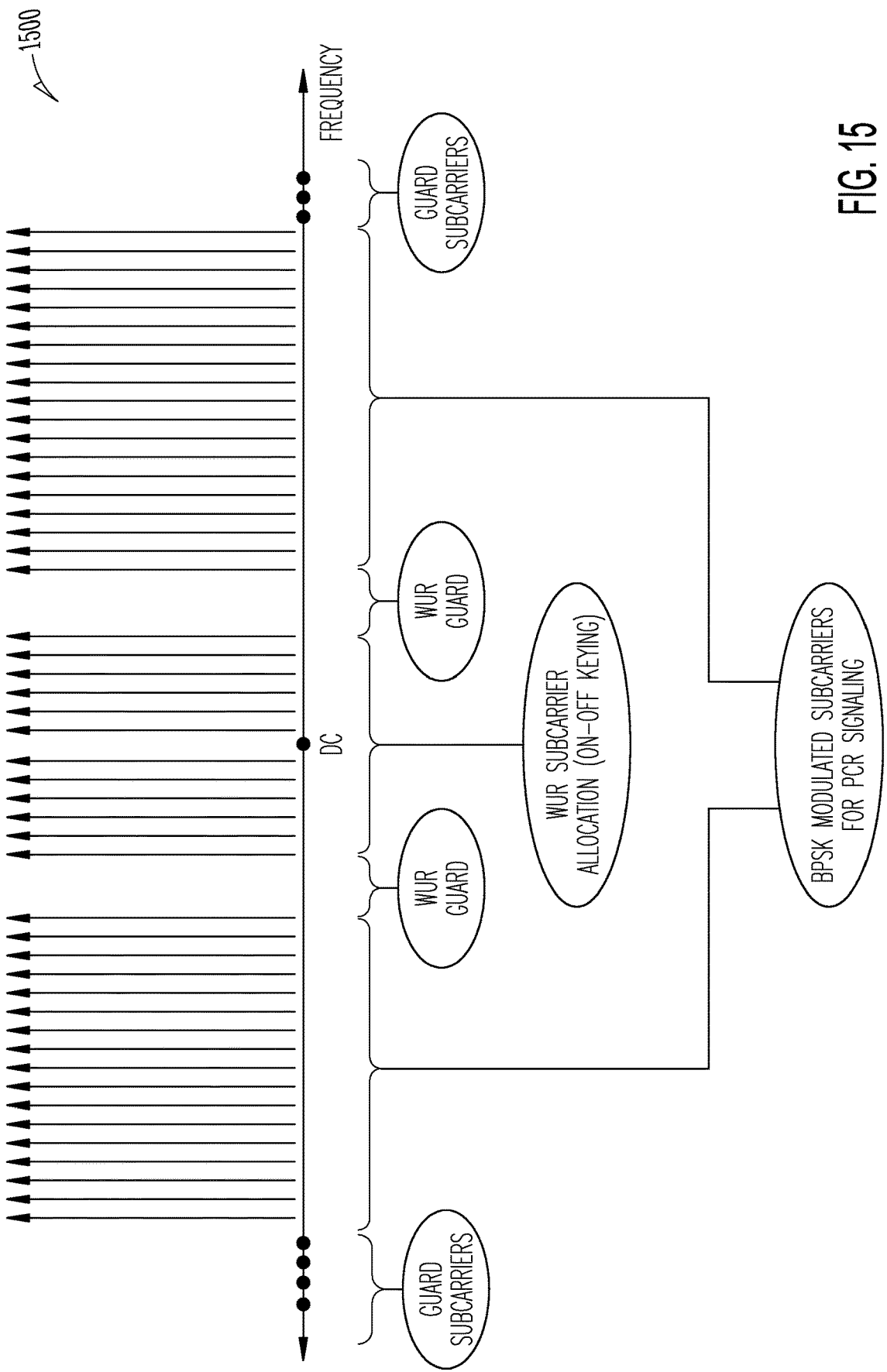
FIG. 15 illustrates an example in the frequency domain for WUR packet transmission in accordance with some embodiments.

FIG. 10 illustrates example wake up radio (WUR) packets and fields in accordance with some embodiments. FIG. 11 illustrates example WUR packets and fields in accordance with some embodiments. FIG. 12 illustrates example WUR packets and fields in accordance with some embodiments. FIG. 13 illustrates an example WUR packet and example fields in accordance with some embodiments. FIG. 14 illustrates an example in the frequency domain for WUR packet transmission in accordance with some embodiments. FIG. 15 illustrates an example in the frequency domain for WUR packet transmission in accordance with some embodiments.

It should be noted that the examples shown in FIGS. 10-15 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-15. Although some of the elements shown in the examples of FIGS. 10-15 may be included in a WLAN standard, Wi-Fi standard, 802.11 standard, 802.11ax standard and/or other standard, embodiments are not limited to usage of such elements that are included in standards.

In some cases, Low Power Wake-Up Receiver (LP-WUR) techniques may enable low power and low-latency operation for Wi-Fi. In some embodiments, a companion radio (such as the WURx 506) may be coupled to a main radio (such as the WLAN radio 505) and may have reduced capabilities and/or minimum capabilities. The WURx 506 may receive a wake-up packet from the AP 502 when there is a packet that is available for the WLAN radio 505. The WLAN radio 505 may remain in a low power mode (such as a WUR mode) while WUR is enabled and may not need to periodically listen to the media for the possible reception of a packet. Thereby significant power savings may be achieved without additional latency, in some cases.

In some embodiments, the transmitter may have a wake-up radio with both transmitting and receiving capabilities. In some embodiments, at the receiver side (the Wi-Fi STA having both Wi-Fi and LP-WURx capabilities), only the receiving operation will be implemented, and due to this reason, it is called a wake-up receiver (WURx) at the receiver side.

In some embodiments, the 802.11 ba specification will adopt FDMA transmission of multiple WUR frames in different 20 MHz channels. An example 1000 is shown in FIG. 10 for FDMA MU WUR OOK transmission using an 80 MHz bandwidth.

The 802.11ba standard supports different data rates. This may cause the following problem. The WUR frames in each 20 MHz portion may have different durations due to different lengths of the WUR frames or different data rate of WUR frames on the different 20 MHz channels. To prevent any 3rd party STA 504 operating on 20 or 40 MHz from sensing an idle channel in one of these channels and doing channel access, the end of WUR transmissions should be aligned. This in particular is problematic in the primary channel when a STA 504 within the BSS of the AP 502 may attempt to transmit an uplink frame to its associated AP 502 while the AP 502 is still busy transmitting WUR packets in non-primary channels. The end of packet alignment in non-primary channels is also important for the STAs 504 which are assessing the channel activity over a wideband or for OBSS stations.

In some embodiments, a padding technique (which may include aspects related to the content of the padding bits and the time granularity which would be suitable for the WUR receivers and transmitter) may be used. In some embodiments, a method may be used to fill the duration of transmission, instead of unused bits, using the time to transmit one or more WUR packets (most likely high data rate WUR packets). This can be viewed as aggregated WUR in time domain or time multiplexing of WURs.

In some cases, proposed padding processes may reduce the complexity of transmitter and receiver, thereby enables a cost effective solution. In some cases, transmission of aggregated WURs or time-multiplexed WURs may enable better spectrum utilization instead of filling the transmission duration with dummy data. In some cases, information encoded in BPSK Mark may enable 11ax+/XT devices to perform early classification of FDMA-WUR packet and as a result may enable them to go to power save mode upon start of WUR portion. In some cases, battery life may be extended.

The current draft of 802.11ba specification (Draft 0.2) defines two possible data rates 62.5 kb/s and 250 kb/s, which are differentiated by the pre-defined sequence in the Wake-Up Radio Synchronization (WUR-Sync) field. The WUR packet structure 1100 is shown in FIG. 11. Manchester-based code is applied to both WUR data rates. Multicarrier On-Off Keying (MC-OOK) is used for modulation of both WUR data rates. This means that encoded bits 0 and 1 are represented by OFF and ON symbols, respectively. The duration of the MC-OOK symbol corresponding to each encoded bit is dependent on WUR data rate: 4 µs for WUR Low Data Rate (WUR-LDR) and 2 µs for WUR High Data Rate (WUR-HDR). The MC-OOK symbol corresponding to each input bit 0 and 1 for WUR-LDR is 1010 and 0101, respectively. The MC-OOK modulated symbol corresponding to each input bit 0 and 1 for WUR HDR is 10 and 01, respectively.

From the above definition for WUR-LDR & WUR-HDR, we can see that the time granularity of the WUR symbol is 4 µs (each info bit in HDR is 4 µs [2 µs ON, 2 µs OFF] or [2 µs ON, 2 µs OFF] and the preamble difference is 64 µs), and hence we define the granularity of padding to also be 4 µs, i.e., the padding length is a multiple of 4 µs, and is defined in units of 4 µs. Also, equivalently, it can be defined as 2 µs; noting that two of the padding units will make one 4 µs unit. This is in case padding is going to be defined in the units of HDR preamble time unit. In addition, we note that WUR receivers search for WUR-Sync to find the start of WUR detection. It is important that padded bits (unused data) are not mistakenly detected as WUR-Sync to prevent false alarm in WUR receivers. To reduce and minimize such a false alarm rate, we propose to pad a packet with all ON symbols without use of Manchester coding.

In some cases, the time duration of a WUR-LDR packet is almost four times the duration of the WUR-HDR packet for the same number of information bits. Hence, if an FDMA transmission includes mix of WUR-LDR and WUR-HDR packets, then the WUR-HDR 20 MHz channel would require a huge amount of padding bits, which we propose to replace with a transmission of 1 to 3 more additional WUR-HDR packets. These WUR-HDRs are transmitted back to back. Each of these packets will start with the WUR-Sync, but will not require the addition of Legacy preamble. A non-limiting example 1200 is shown in FIG. 12.

In some embodiments, the end of packet alignment in FDMA. WUR may be addressed by (a) defining padded bits as 2 ∞s ON OOK symbols and (b) replacing padding with transmission of more WUR packets in an aggregated fashion when legacy preamble and BPSK Mark are not included for subsequent WUR transmission.

The WURx 506 may be a companion radio to the main Wi-Fi radio (such as WLAN radio 505), with a capability of receiving short messages. It may enable the main Wi-Fi radio go to sleep, thereby achieving significant power savings without additional latency. As a result, it is very attractive for IoT and Wearable applications and generally in dense deployments. It was introduced to the IEEE 802.11 standards and subsequently a task group was created (TGba). The use cases for 802.11ba have been extended to support a scanning and discovery operation. For handoff purposes, currently the devices must use the main radio to tune off the channel and scan for neighbor channels. With Low Power-WUR, the devices can continue using the main radio for ongoing communication and the WUR can be used for scanning and discovery.

In 802.11ba, the packet that has been adopted comprises a legacy portion for deferral of legacy devices, followed by a BPSK mark symbol which is followed by the WUR preamble and WUR data symbols. The BPSK mark is to aid auto detection for legacy devices so they properly defer. In some embodiments, the BPSK mark may be a single 20-MHz OFDM symbol with BPSK modulation. In some cases, dummy bits may be used in this field, since it cannot be decoded by the WUR, and cannot be understood by legacy systems. In some embodiments, the symbol may be utilized to convey information to either the WUR, or to next generation systems. In some embodiments, a design may allow both WUR signaling and Next Generation signaling.

In some embodiments, the BPSK mark symbol may use a subcarrier spacing of 312.5 kHz and a duration of 4 µs. Several methods are proposed below, and are referred to for clarity, and without limitation, as "method #1," "method #2," and "method #3."

In method #1, the BPSK mark is encoded with known bits (signaling data) which enables 11ax+/XT devices to perform early classification of the WUR packet and as a result enables them to go to power save mode upon start of WUR portion. The main advantage is extending their battery life. This would be different from the current approach of just sending a set of "dummy" bits. Here several bits could be utilized for signaling of next gen devices. This also provides a way for next gen WUR designs to be optimized.

In method #2, the symbol sends BPSK data on all of the data subcarriers except for the inner 13 subcarriers. These inner subcarriers will carry a WUR symbol. Meaning the inner 13 tones would have a fixed On-Off Keying symbol that could be utilized by the WUR to extend the WUR sync portion of the symbol. This could be used by the WUR to aid in early AGC settling, aid in WUR packet detection, aid in WUR synchronization.

In method #3, there are a few guard subcarriers allocated between the inner WUR subcarriers (on-off keying modulated) and the PCR BPSK modulated subcarriers. The inner 13 subcarriers are modulated using On-Off Keying, then there will be TBD subcarriers that are nulled followed by the remaining subcarriers which are modulated with BPSK data that would be utilized by next generation systems to aid in early auto detection.

In some embodiments, four tones are added to L_SIG portion to allow inclusion of 4 data subcarriers for BPSK mark. This follows a similar method to the one proposed in 11ax to extend data subcarriers in HE-SIGA. In 11ax the subcarriers where added to L-SIG and RL-SIG for channel estimation prior to HE-SIGA with needed repetition to match the range of L-LTF repeated symbols. However 11ax+/XT device may not need the repetition in terms of their range relative to WUR. Therefore the extra four tones in L-SIG are used for channel estimation, and they are used in BPSK mark for added information bits.

Potential advantages of populating the BPSK mark with data are described below. First, for the BPSK data subcarriers, they can be used by Next Generation (11ax-XT) devices to perform early classification of the WUR packet and as a result enables them to go to power save mode upon start of WUR portion. Another potential advantage is extending their battery life. Second, populating the inner 13 subcarriers of the BPSK mark with a WUR On-Off Keying symbol helps the WUR by aiding that receiver for detection and acquisition.

The current draft of 802.11ba specification (Draft 0.2) defines packet that has been adopted consists of a legacy portion for deferral of legacy devices, this is followed by a BPSK mark symbol which is followed by the WUR preamble and WUR data symbols. The currently specified packet structure for 802.11ba is shown in FIG. 13. The BPSK mark is to aid auto detection for legacy devices so they properly defer. At this point in the discussion and design, there has been no discussion of the contents of the BPSK mark. The BPSK mark is defined in the current 802.11ba draft specification as "a single 20-MHz OFDM symbol with BPSK modulation. The values of the BPSK subcarriers are TBD." Currently the discussion has been around to just use dummy bits in this field, since it cannot be decoded by the WUR, and cannot be understood by legacy systems.

In method #1, the BPSK mark is encoded with known bits (signaling data) which enables 11ax+/XT devices to perform early classification of the WUR packet and as a result enables them to go to power save mode upon start of WUR portion. The main advantage is extending their battery life. We also suggest to add four tones to L_SIG portion to allow inclusion of 4 data subcarriers for BPSK mark. This follows a similar method to the one proposed in 11ax to extend data subcarriers in HE-SIGA. In 11ax the subcarriers added to L-SIG and RL-SIG for channel estimation prior to HE-SIGA with needed repetition to match the range of L-LTF repeated symbols. However 11ax+/XT device may not need the repetition in terms of their range relative to WUR. Therefore the extra four tones in L-SIG are used for channel estimation, and they are assigned in the BPSK mark symbol for added information bits.

In method #2, the symbol sends BPSK data on all of the data subcarriers except for the inner 13 subcarriers. These inner subcarriers will carry a WUR symbol. Meaning the inner 13 tones would have a fixed On-Off Keying symbol that could be utilized by the WUR to extend the WUR sync portion of the symbol. This could be used by the WUR to aid in early AGC settling, aid in WUR packet detection, aid in WUR synchronization.

In method #3, there are a few guard subcarriers allocated between the inner WUR subcarriers (on-off keying modulated) and the PCR BPSK modulated subcarriers. The inner 13 subcarriers are modulated using On-Off Keying, then there will be TBD subcarriers that are nulled followed by the remaining subcarriers which are modulated with BPSK data that would be utilized by next generation systems to aid in early auto detection.

In method #1, the BPSK mark has known (signaling data to Next Gen devices) data bits which is interleaved and then rate ½ BCC encoded, exactly like the L-SIG. In this approach, it is composed of 24 bits information bits or 26 bits information bits when the extra four tones are added to L-SIG. The detailed definition of its fields is beyond the scope of this IDF. However, it is predicted that 1 or more bits are used to signal the packet type as FDMA-WUR, and 2 bits are used to carry the bandwidth of FDMA WUR.

In method #2, the BPSK mark has its data subcarriers split into two groups. The approach is illustrated in FIG. 14. The first group includes 40 (or 44) subcarriers used for signaling next gen devices using BPSK modulated, code rate=½ BCC encoded data bits. The second group includes 13 subcarriers (including DC which is nulled in 11ba), which are modulated using On-Off Keying. The current 11ba specification has adopted the 13 subcarriers using on-off keying as the waveform. Thus populating these subcarriers will enable this symbol to look like the start of the WUR preamble, instead of the symbol after the BPSK Mark. This provides 1 additional WUR bit periods (4 µs). The use of the symbol at this point is beyond the scope of this IDE. In some embodiments, they could be either [2 us on, 2 us off], or [2 us off, 2 us on].

Using the inner 13 subcarriers this way will not impact the detection of a BPSK symbol by legacy devices. The legacy devices will be classifying this symbol as BPSK as opposed to a rotated BPSK as long as the outer 40 (44 with four added tones) subcarriers are normal BPSK modulated subcarriers. The BPSK mark was added to .11ba to prevent 802.11n devices from detecting the first symbol of the WUR preamble as rotated BPSK (4 us of On in 4 MHz with the rest of the 20 MHz being noise). Thus having a BPSK mark makes the .11n devices (and other legacy devices) classify this WUR packet not a .11n/.11ac/.11ax packet. In addition the central 4 MHz WUR can be formed by populating 13 subcarriers with BPSK values (DC is nulled). The detection of this at Wi-Fi devices is very reliable and follows the normal BPSK vs. rotated BPSK testing by comparing in-phase energy to quadrature. For example, the detection of BPSK would be on the order of 14 dB better than detecting a bit in the L-SIG. Thus, using 12 of the subcarriers would result in a degradation on the order of 2.5 dB. Therefore it should have no impact those devices correctly classifying based on this symbol. The On-Off keying nature of the .11ba symbol on the inner carriers should not results in any additional degradation. If the On-Off keying is done using BPSK, there will be even less degradation. If QPSK is ultimately chosen in .11ba, then there will be energy in both I and Q, so the net degradation will not increase.

In method #3, again a mix of BPSK and WUR On-Off keying is used, but in this case some tone are removed from the BPSK signaling to provide guard to the On-Off keying. As a note, if the WUR bit used employs Manchester coding, then the adjacent interference to the On portion to the Off portion can be cancelled. This concept is shown in FIG. 15. Having some guard will improve the detection of the On-Off keying bits for the WUR. The WUR is targeted to be a very low cost device, where the device will not detect data as well as the primary radio, and can be affected by adjacent signals. In FIG. 15, an approach is illustrated in which the data subcarriers are split amount BPSK bits for a PCR and On-Off keying bits for the WUR, in addition to some guard subcarriers for the WUR.

The approaches above provide a means to provide and additional On-Off keying WUR symbol using the BPSK mark. The use of the symbols at this point is beyond the scope of this IDF. The preferred embodiment is to design this extra symbol in order to enable the WUR to aid in early AGC settling, aid in WUR packet detection or aid in WUR synchronization. The approach also allows for the BPSK mark symbol to provide extra signaling which would be used by future Wi-Fi systems to aid in the early classification of a WUR packet and as a result enables them to go to power save mode upon start of WUR portion. The main advantage is extending their battery life.

In some embodiments, four tones may be added to L_SIG portion of the Legacy preamble to allow inclusion of 4 data subcarriers for BPSK mark. This follows a similar method to the one proposed in 11ax to extend data subcarriers in HE-SIGA. The extra four tones in L-SIG could be used for channel estimation, and they are assigned in the BPSK mark symbol for added information bits.

A Wake-Up Receiver (WUR) is a companion radio to the main Wi-Fi radio, with a capability of receiving short control messages. It enables the main Wi-Fi radio go to sleep, thereby achieving significant power savings without additional latency. As a result, it is very attractive for IoT and Wearable applications and generally in dense deployments. It was introduced to the IEEE 802.11 standards and subsequently a task group was created (TGba). The use cases for 802.11ba have been extended to support a scanning and discovery operation. For handoff purposes, currently the devices must use the main radio to tune off the channel and scan for neighbor channels. With Low Power-WUR, the devices can continue using the main radio for ongoing communication and the WUR can be used for scanning and discovery.

The packet that has been adopted for 802.11ba includes a legacy portion for deferral of legacy devices, which is followed by a BPSK mark symbol which is followed by the WUR preamble and WUR data symbols. The BPSK mark is to aid auto detection for legacy devices so they properly defer. The BPSK mark is defined in the current .11ba draft specification as "a single 20-MHz OFDM symbol with rate ½ coded BPSK modulation. In some cases, dummy bits may be used in this field, since it cannot be decoded by the WUR, and cannot be understood by legacy systems. In some embodiments, the symbol may convey information to next generation systems. A potential issue with usage of undefined dummy bits is that when WUR devices are deployed, each vendor may set its own set of dummy bits and may make it impossible for future amendments to define and detect useful information.

The BPSK mark symbol will use a subcarrier spacing of 312.5 kHz and a duration of 4 us. In some cases, the BPSK mark symbol may be populated with dummy bits. A potential reason is that the use for the BPSK mark is for legacy devices to auto detect and properly defer. So it cannot be used solely as a narrowband WUR symbol, and cannot carry any information that could be utilized by the legacy devices since they will assume either it is an .11a packet or 11ax packet and defer (not decode the BPSK mark).

In some embodiments, the BPSK mark may be encoded with known bits (signaling data) which enables EHT devices to perform early classification of the WUR packet and as a result enables them to act appropriately, for example, go to power save mode upon start of WUR portion. The main advantage is utilizing spectrum more efficiently and extending the battery life of future devices. This would be different from an approach of just sending a set of "dummy" bits. Here several bits could be utilized for signaling of next gen devices. This also provides a way for next gen WUR designs to be optimized.

In addition, four tones may be added to L-SIG portion to allow inclusion of 4 data subcarriers for BPSK mark. This follows a similar method to the one proposed in flax to extend data subcarriers in HE-SIGA. In 11ax the subcarriers where added to L-SIG and RL-SIG for channel estimation prior to HE-SIGA with needed repetition to match the range of L-LTF repeated symbols. However EHT device may not need the repetition in terms of their range relative to WUR. Therefore the extra four tones in L-SIG are used for channel estimation, and they are used in BPSK mark for added information bits.

Potential advantages of populating the BPSK mark with known data/format are that they can be used by Next Generation EHT devices to perform early classification of the WUR packet and as a result enables better spectrum utilization and improved battery life. The information in BPSK mark can enable spatial reuse and/or can enable EHT devices to go to power save mode upon start of WUR portion.

In some embodiments, a packet in the 802.11ba specification (Draft 0.4) may include a legacy portion for deferral of legacy devices, which is followed by a BPSK mark symbol, which is followed by the WUR Sync and WUR data symbols. The currently specified packet structure for 802.11ba is shown in FIG. 13. The BPSK mark is to aid auto detection for legacy devices so they properly defer. In some embodiments, the BPSK mark may be a coded rate ½ OFDM symbol.

Several methods are proposed below, and are referred to for clarity, and without limitation, as "method #1b," and "method #2b." In method 1b, the BPSK mark may be encoded with known and reserve bits, which enables EHT to later define the reserve bits. The main advantage is managing the early deployments of 11ba (WUR Release 1; also called Legacy WUR) and allowing use of these bits in EHT. In method 2b, one or more fields may be defined in EHT to enable spatial reuse and efficient spectrum utilization as well as improved battery life.

In some embodiments, four tones may be added to L-SIG portion to allow inclusion of 4 data subcarriers for BPSK mark. This follows a similar method to the one proposed in 11ax to extend data subcarriers in HE-SIGA. In 11ax the subcarriers where added to L-SIG and RL-SIG for channel estimation prior to HE-SIGA with needed repetition to match the range of L-LTF repeated symbols. However EHT device may not need the repetition in terms of their range relative to WUR. Therefore the extra four tones in L-SIG are used for channel estimation, and they are assigned in the BPSK mark symbol for added information bits.

In method 1b, the following fields are defined for the BPSK Mark: a) type: 2 bits with specific value for example 11 to indicate "TGba release 1" where there is no EHT deployment yet; b) CRC: for example 6 or 7 or 8 bits; c) the rest are reserved. As an alternative to the above, the BPSK. Mark is not defined as a repeat of L-RIG (RL-SIG as defined in 11ax), since EHT devices will decode Legacy WUR as 11ax and will not leverage the mentioned advantages. The BPSK. Mark can be 180 degree-phase-rotated repeat of L-SIG.

In method #2b, which will be defined in EHT, the fields of BPSK Mark are defined in a generic signaling to allow for power save and spatial reuse. An example is to define them similarly to 11ax, as follows: a) BSS color: e.g., 6 bits; b) UL/DL: e.g., 1 bit, c) TxOP duration (optional): e.g., 7 bits to enable protection (like NAV) for the entire TxOP (COT in ETSI BRAN terms); d) type: e.g., 3 bits (such as WUR, NR, EHT and/or other); e) CRC: e.g., 7 bits. The above is an example, but it is understood that the BPSK mark is not limited to the names, sizes (in terms of bits and/or other), types and/or other aspects of the fields described above. In some embodiments, the BPSK mark may not necessarily include one or more of those fields. In some embodiments, the BPSK mark may include one or more additional fields. In some embodiments, a specific value of BSS Color may indicate "no spatial reuse" and/or similar.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wake-up radio (WUR) access point (AP) (WUR AP), the apparatus comprising: processing circuitry; and memory, the processing circuitry configured to:

encode a WUR frequency division multiple access (FDMA) physical layer convergence procedure (PLCP) protocol data unit (PPDU) (WUR FDMA PPDU) for transmission on a 40 MHz channel bandwidth comprising two contiguous 20 MHz subchannels, the WUR FDMA PPDU comprising a WUR transmission on each of the contiguous 20 MHz subchannels, the WUR FDMA PPDU comprising a preamble and an FDMA WUR portion following the preamble, and the FDMA WUR portion comprising a WUR synchronization field (WUR-Sync) followed by a WUR data field (WUR-Data) encoded for transmission on each 20 MHz subchannel, wherein each WUR synchronization field indicates a data rate applied to the WUR data field which follows the WUR synchronization field on an associated one of the 20 MHz subchannels, and the data rate comprises either a WUR low-data rate (WUR LDR) or a WUR high-data rate (WUR HDR), wherein the preamble comprises a legacy signal field (L-SIG) indicating a length of the WUR FDMA PPDU, wherein the WUR synchronization field and the WUR data field comprise multicarrier on-off keying (MC-OOK) waveforms, wherein the processing circuitry is configured to modulate data for the WUR data field using MC-OOK modulation in accordance with either the WUR LDR or the WUR HDR, and wherein the processing circuitry is further configured to determine if padding is needed for any of the 20 MHz channels of the WUR FDMA PPDU based on whether a duration of the WUR transmission on any of the 20 MHZ subchannels is shorter than the length indicated by the L-SIG, wherein if padding is needed on any of the 20 MHz subchannels, the processing circuitry is configured to generate a padding waveform by repeating the MC-OOK waveform corresponding to an information bit having a value of one modulated in accordance with the WUR HDR, the padding waveform to be transmitted after the WUR data field on each of the 20 MHz subchannels determined to need padding.

2. The apparatus of claim 1, wherein the WUR synchronization field comprises a predetermined sequence modulated in accordance with the MC-OOK waveform, and wherein the WUR data field comprises encoded bits modulated in accordance with the MC-OOK waveform.

3. The apparatus of claim 1, wherein the processing circuitry is configured to encode information bits to generate encoded bits, the encoded bits to be represented by on and off symbols of the MC-OOK waveform, wherein the WUR-Data field for the WUR LDR, each symbol is configured to have a 4-microsecond duration, and wherein the WUR Data field for the WUR HDR, each symbol is configured to have a 2-microsecond duration.

4. The apparatus of claim 3, wherein for the WUR LDR, the WUR data field is configured to be transmitted at a data rate of 62.5 kb/s, and wherein for the WUR HDR, the WUR data field is configured to be transmitted at a data rate of 250 kb/s.

5. The apparatus of claim 1 wherein if padding is determined to be needed on a 20 MHz subchannel in which the WUR data field is to be transmitted in accordance with the WUR LDR, the processing circuitry is configured to generate the padding waveform by repeating the MC-OOK waveform of a WUR HDR information bit having a value of one.

6. The apparatus of claim 5 wherein if padding is determined to be needed on a 20 MHz subchannel in which the WUR data field is to be transmitted in accordance with the WUR HDR, the processing circuitry is configured to generate the padding waveform by repeating the MC-OOK waveform of a WUR HDR information bit having a value of one.

7. The apparatus of claim 6, wherein the information bit of value 1 corresponds to an encoded bit pair of [0,1].

8. The apparatus of claim 1, wherein the padding waveform is to be transmitted after the WUR data field on each of the 20 MHz subchannels determined to need padding to lengthen the WUR transmission up to the length indicated by the L-SIG.

9. The apparatus of claim 1 wherein the preamble of the WUR FDMA PPDU comprises a preamble portion that is duplicated for concurrent transmission on each 20 MHz channel, wherein the preambles comprise orthogonal frequency division multiplexed (OFDM) signals.

10. The apparatus of claim 1, wherein the preamble comprises a binary phase-shift keying (BPSK) mark field (BPSK-Mark) following the L-SIG, the BPSK mark field to spoof high throughput (HT) stations (STAs) from false PPDU format detection.

11. The apparatus of claim 1, wherein the WUR FDMA PPDU is configured to wake-up a WUR non-AP station.

12. A non-transitory computer-readable storage medium that stores instructions for execution by processing circuitry of a wake-up radio (WUR) access point (AP) (WUR AP), the processing circuitry configured to:

encode a WUR frequency division multiple access (FDMA) physical layer convergence procedure (PLCP) protocol data unit (PPDU) (WUR FDMA PPDU) for transmission on a 40 MHz channel bandwidth comprising two contiguous 20 MHz subchannels, the WUR FDMA PPDU comprising a WUR transmission on each of the contiguous 20 MHz subchannels, the WUR FDMA PPDU comprising a preamble and an FDMA WUR portion following the preamble, and the FDMA WUR portion comprising a WUR synchronization field (WUR-Sync) followed by a WUR data field (WUR-Data) encoded for transmission on each 20 MHz subchannel, wherein each WUR synchronization field indicates a data rate applied to the WUR data field which follows the WUR synchronization field on an associated one of the 20 MHz subchannels, and the data rate comprises either a WUR low-data rate (WUR LDR) or a WUR high-data rate (WUR HDR), wherein the preamble comprises a legacy signal field (L-SIG) indicating a length of the WUR FDMA PPDU, wherein the WUR synchronization field and the WUR data field comprise multicarrier on-off keying (MC-OOK) waveforms, wherein the processing circuitry is configured to modulate data for the WUR data field using MC-OOK modulation in accordance with either the WUR LDR or the WUR HDR, and wherein the processing circuitry is further configured to determine if padding is needed for any of the 20 MHz channels of the WUR FDMA PPDU based on whether a duration of the WUR transmission on any of the 20 MHZ subchannels is shorter than the length indicated by the L-SIG, wherein if padding is needed on any of the 20 MHz subchannels, the processing circuitry is configured to generate a padding waveform by repeating the MC-OOK waveform corresponding to an information bit having a value of one modulated in accordance with the WUR HDR, the padding waveform to be transmitted after the WUR data field on each of the 20 MHz subchannels determined to need padding.

13. The non-transitory computer-readable storage medium of claim 12, wherein the WUR synchronization field comprises a predetermined sequence modulated in accordance with the MC-OOK waveform, and wherein the WUR data field comprises encoded bits modulated in accordance with the MC-OOK waveform.

14. The non-transitory computer-readable storage medium of claim 12, wherein the processing circuitry is configured to encode information bits to generate encoded bits, the encoded bits to be represented by on and off symbols of the MC-OOK waveform, wherein the WUR-Data field for the WUR LDR, each symbol is configured to have a 4-microsecond duration, and wherein the WUR Data field for the WUR HDR, each symbol is configured to have a 2-microsecond duration.

15. The non-transitory computer-readable storage medium of claim 14, wherein for the WUR LDR, the WUR data field is configured to be transmitted at a data rate of 62.5 kb/s, and
wherein for the WUR HDR, the WUR data field is configured to be transmitted at a data rate of 250 kb/s.

16. The non-transitory computer-readable storage medium of claim 12 wherein if padding is determined to be needed on a 20 MHz subchannel in which the WUR data field is to be transmitted in accordance with the WUR LDR, the processing circuitry is configured to generate the padding waveform by repeating the MC-OOK waveform of a WUR HDR information bit having a value of one.

17. The non-transitory computer-readable storage medium of claim 16 wherein if padding is determined to be needed on a 20 MHz subchannel in which the WUR data field is to be transmitted in accordance with the WUR HDR, the processing circuitry is configured to generate the padding waveform by repeating the MC-OOK waveform of a WUR HDR information bit having a value of one.

18. An apparatus of a wake-up radio (WUR) non-access point (non-AP) station (STA) (WUR non-AP STA), the apparatus comprising: processing circuitry; and memory, wherein the processing circuitry is configured to:
decode a 20 MHz subchannel portion of a WUR frequency division multiple access (FDMA) physical layer convergence procedure (PLCP) protocol data unit (PPDU) (WUR FDMA PPDU) transmitted on a 40 MHz channel bandwidth comprising two contiguous 20 MHz subchannels, the WUR FDMA PPDU comprising a WUR transmission on each of the contiguous 20 MHz subchannels, the WUR FDMA PPDU comprising a preamble and an FDMA WUR portion following the preamble, and the FDMA WUR portion comprising a WUR synchronization field (WUR-Sync) followed by a WUR data field (WUR-Data) encoded for transmission on each 20 MHz subchannel, wherein each WUR synchronization field indicates a data rate applied to the WUR data field which follows the WUR synchronization field on an associated one of the 20 MHz subchannels, and the data rate comprises either a WUR low-data rate (WUR LDR) or a WUR high-data rate (WUR HDR),
wherein the preamble comprises a legacy signal field (L-SIG) indicating a length of the WUR FDMA PPDU,
wherein the WUR synchronization field and the WUR data field comprise multicarrier on-off keying (MC-OOK) waveforms,
wherein the processing circuitry is configured to demodulate data of the WUR data field using a MC-OOK demodulation technique in accordance with either the WUR LDR or the WUR HDR, and
wherein the processing circuitry is further configured to demodulate padding within the 20 MHz channels of the WUR FDMA PPDU if a duration of the WUR transmission on any of the 20 MHZ subchannels is shorter than the length indicated by the L-SIG,
wherein the processing circuitry is configured to demodulate a padding waveform that comprises a repeated MC-OOK waveform corresponding to an information bit having a value of one modulated in accordance with the WUR HDR, the padding waveform being received after the WUR data field on each of the 20 MHz subchannels.

19. The apparatus of claim 18, wherein the WUR synchronization field comprises a predetermined sequence modulated in accordance with the MC-OOK waveform, and
wherein the WUR data field comprises encoded bits modulated in accordance with the MC-OOK waveform.

20. The apparatus of claim 18, wherein the processing circuitry wherein the WUR-Data field for the WUR LDR, each symbol is configured to have a 4-microsecond duration, and
wherein the WUR Data field for the WUR HDR, each symbol is configured to have a 2-microsecond duration.

* * * * *

UNITED STATES PATENT AND TRADEMARK OFFICE
CERTIFICATE OF CORRECTION

PATENT NO. : 10,939,378 B2
APPLICATION NO. : 16/891558
DATED : March 2, 2021
INVENTOR(S) : Azizi et al.

Page 1 of 1

It is certified that error appears in the above-identified patent and that said Letters Patent is hereby corrected as shown below:

On the Title Page

On page 2, in Column 2, under "Other Publications", Line 15, delete "16/381,549," and insert --16/381,548,-- therefor Signed and Sealed this
Eighteenth Day of May, 2021

Drew Hirshfeld
*Performing the Functions and Duties of the
Under Secretary of Commerce for Intellectual Property and
Director of the United States Patent and Trademark Office*